US009230232B2

(12) United States Patent
McCormick et al.

(10) Patent No.: US 9,230,232 B2
(45) Date of Patent: Jan. 5, 2016

(54) VEHICLE FLEET WORK ORDER MANAGEMENT SYSTEM

(71) Applicant: Telogis, Inc., Aliso Viejo, CA (US)

(72) Inventors: Sean McCormick, Los Angeles, CA (US); Jason Koch, Aliso Viejo, CA (US); Arthur N. Morris, Laguna Beach, CA (US); Ralph Mason, Middleton (NZ); William Elliot, Christchurch (NZ)

(73) Assignee: TELOGIS, INC., Aliso Viejo, CA (US)

( * ) Notice: Subject to any disclaimer, the term of this patent is extended or adjusted under 35 U.S.C. 154(b) by 293 days.

(21) Appl. No.: 13/623,834

(22) Filed: Sep. 20, 2012

(65) Prior Publication Data

US 2013/0069803 A1     Mar. 21, 2013

Related U.S. Application Data

(60) Provisional application No. 61/536,982, filed on Sep. 20, 2011.

(51) Int. Cl.
| | | |
|---|---|---|
| *G08G 1/123* | (2006.01) | |
| *G06Q 10/08* | (2012.01) | |
| *G08G 1/00* | (2006.01) | |
| *G01C 21/34* | (2006.01) | |

(52) U.S. Cl.
CPC ............ *G06Q 10/0833* (2013.01); *G08G 1/202* (2013.01); *G01C 21/34* (2013.01)

(58) Field of Classification Search
CPC ............ G08G 1/20; G07C 5/008; G07C 5/00; G06Q 10/0631
USPC .................................................. 340/988–996
See application file for complete search history.

(56) References Cited

U.S. PATENT DOCUMENTS

| | | | |
|---|---|---|---|
| 5,724,243 A * | 3/1998 | Westerlage et al. ........ 455/456.5 |
| 5,880,958 A | 3/1999 | Helms et al. |
| 6,675,150 B1 | 1/2004 | Camer |
| 7,194,347 B2 | 3/2007 | Harumoto et al. |
| 7,957,871 B1 | 6/2011 | Echeruo |
| 7,974,774 B2 | 7/2011 | Kumar |
| 8,103,532 B2 | 1/2012 | Kenefic |
| 8,194,986 B2 | 6/2012 | Conwell |
| 8,290,701 B2 | 10/2012 | Mason et al. |
| 8,315,802 B2 | 11/2012 | Brown |
| 8,452,529 B2 | 5/2013 | Alten |
| 2003/0018428 A1 | 1/2003 | Knockeart et al. |

(Continued)

OTHER PUBLICATIONS

Kim Byung-In, Seongbae Kim, and Surya Sahoo. "Waste collection vehicle routing problem with time windows." Computers & Operations Research 33.23 (2006):3624-3642.

(Continued)

*Primary Examiner* — Fekadeselassie Girma
*Assistant Examiner* — Thomas McCormack
(74) *Attorney, Agent, or Firm* — Knobbe, Martens, Olson & Bear LLP

(57) ABSTRACT

Vehicle management systems and associated processes can monitor the progress of assets, such as vehicle, along predetermined routes and report the progress to user. The system can compare the actual status of the vehicle to the expected status of the vehicle and to report any difference between the actual status and expected status to a user. Further, the system can receive a predetermined threshold value of the difference from a user and report to the user if the predetermined threshold has been exceeded.

20 Claims, 8 Drawing Sheets

(56) References Cited

U.S. PATENT DOCUMENTS

| | | | |
|---|---|---|---|
| 2004/0088392 | A1 | 5/2004 | Barrett et al. |
| 2005/0004757 | A1 | 1/2005 | Neeman et al. |
| 2006/0184403 | A1 | 8/2006 | Scott et al. |
| 2006/0184405 | A1 | 8/2006 | Scott et al. |
| 2006/0213817 | A1 | 9/2006 | Scott et al. |
| 2007/0179709 | A1 | 8/2007 | Doyle |
| 2007/0233374 | A1 | 10/2007 | Diekhans et al. |
| 2007/0241882 | A1* | 10/2007 | Panttaja et al. ............... 340/521 |
| 2007/0288163 | A1* | 12/2007 | Meyer et al. ................... 701/211 |
| 2009/0326991 | A1 | 12/2009 | Wei et al. |
| 2010/0168942 | A1* | 7/2010 | Noffsinger et al. ............. 701/21 |
| 2010/0287073 | A1 | 11/2010 | Kocis et al. |
| 2012/0029964 | A1* | 2/2012 | Tengler et al. ............... 705/7.19 |
| 2013/0079964 | A1 | 3/2013 | Sukkarie et al. |
| 2013/0096815 | A1 | 4/2013 | Mason et al. |
| 2013/0339098 | A1 | 12/2013 | Looman et al. |
| 2013/0339266 | A1 | 12/2013 | Looman et al. |

OTHER PUBLICATIONS

The Stable Marriage Problem http://www.cs.vassar.edu/~cs241/teneyck/TheStableMarriageProblem.pdf, 2 pages, accessed on Apr. 29, 2013.

International Search Report and Written Opinion issued in application No. PCT/US2013/042924 mailed on Dec. 20, 2013, in 10 pages.

International Search Report and Written Opinion issued in application No. PCT/US13/46016 mailed on Dec. 30, 2013, in 14 pages.

Raidl et al., "Greedy heuristics and an Evolutionary Algorithm for the Bounded-Diameter Minimum Spanning Tree Problem.", SAC, Melbourne, FL, pp. 747-752, 2003.

Malik et al., "Combinatorial Motion Planning of Multiple Vehicle Systems", Proceedings of the 45$^{th}$ IEEE Conference on Decision and Control, Manchester Grand Hyatt Hotel, San Diego, CA, Dec. 13-15, 2006, pp. 5299-5304.

International Search Report and Written Opinion issued in application No. PCT/US2012/059404 on Jan. 17, 2013.

A Tutorial on Clustering Algorithms, Fuzzy C-Means Clustering, http://home.dei.polimi.it/matteucc/Clustering/tutorial_html/cmeans.html, 5 pages, accessed on May 8, 2012.

Ant Colony Optimization Algorithms, From Wikipedia, http://en.wikipedia.org/wiki/Ant_colony_optimization_altorithms . . . , 13 pages, accessed on May 8, 2012.

International Search Report and Written Opinion issued in application No. PCT/US12/56423 on Apr. 4, 2013.

\* cited by examiner

VEHICLE FLEET WORK ORDER MANAGEMENT SYSTEM

RELATED APPLICATIONS

This application claims the benefit of priority under 35 U.S.C. §119(e) to U.S. Provisional Patent Application No. 61/536,982, filed on Sep. 20, 2011, entitled "VEHICLE FLEET WORK ORDER MANAGEMENT SYSTEM," which is hereby incorporated by reference in its entirety.

BACKGROUND

Route selection or optimization has applications in vehicle routing, printed wire circuit layout, chip design and layout, and biological activities. Trucking and other vehicle fleets, for instance, select vehicle routes to deliver goods to various destinations. Similarly, transportation companies route vehicles to pick up and drop off passengers. In addition to land-based vehicles, route selection can also be used for ship, airplane, and rail transport route scheduling.

A typical route selection problem is to reduce or minimize the distance traveled or time spent traveling. Route selection problems might consider such factors as a number of turns in a given route, a number of intersections, speed limits, bridge crossings, and the like. Algorithms modeled using concepts from graph theory are often used to select routes.

SUMMARY

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

An aspect of at least one of the inventions disclosed herein includes the realization that when a vehicle fleet professional, such as a dispatcher, is monitoring operations of a vehicle fleet benefits can be provided by automatically comparing the actual progress of vehicles within the fleet with the preplanned routes for those vehicles. For example, a dispatcher might manually generate routes for vehicles in a fleet or may use a software solution for automatically generating routes for the vehicles in the fleet. The drivers of each vehicle would follow the manually or automatically generated routes, which may include a number of different stops over the day. During operation of some vehicle fleets, the progress of each driver is determined at certain times of the day, for example, when the driver calls into the fleet management professional to report location or other information such as stops completed or stops missed.

This technique of tracking progress of vehicles within a fleet can require many phone calls and a substantial amount of manual work in tracking progress. Further, when it is determined that a driver has missed a call, a stop, or an appointment, the fleet management professional may be required to alter the day's routing of the vehicle that missed an appointment and/or alter the routes of other vehicles in an attempt to avoid failing to achieve the goals or functions of the scheduled stop that might be missed.

An aspect of at least one of the inventions disclosed herein includes the realization that by automatically comparing progress of vehicles in a fleet with the predetermined routes, vehicle fleet management professionals can more quickly act to avoid missed stops and the associated potential losses, including lost income from failing to conduct a planned transaction or failing to meet a customer's expectations. Further benefits can be achieved with the optional techniques for comparing actual progress with the preplanned route. For example, a preplanned route can have a predicted cost associated with it. For example, a cost calculation software application can be used to calculate the expected fuel consumption of a vehicle along a preplanned route in addition to predicting times of the day when the vehicle will reach certain points along a route. Optionally, a routing progression system and method could use engine diagnostic data from an associated vehicle to determine actual fuel consumption and to compare the actual fuel consumption with the predicted fuel consumption. These and other comparisons can be provided to a vehicle fleet management professional over the course of a day, in various ways, so as to provide the professional with more timely notifications of the progress of vehicles. Such notifications can assist the vehicle fleet management professional in avoiding losses and rescheduling stops.

In accordance with some embodiments, a system for monitoring progress of a plurality of vehicles in a vehicle fleet can comprise a routing module configured to generate at least one predetermined route for at least one of the vehicles. Additionally, a progress monitoring module can be configured to determine an actual status of the at least one vehicle and to compare the actual status to an expected status of the vehicle along the predetermined route.

In some embodiments, a method for monitoring the progress of a plurality of vehicles in a vehicle fleet can comprise determining an actual status of at least one vehicle in a vehicle fleet, determining and expected status of the at least one vehicle along a predetermined route, determining a difference between the expected status and the actual status, and reporting the difference to a user.

In certain embodiments, a network-based or web-based work order management development and visualization system is disclosed. Management of small to large fleets can involve daily, weekly, or monthly planning, which can define the scheduling and routing of mobile assets (such as vehicles). The planning can be done by developing work orders that define the resource requirements, a schedule of stops for service or delivery, an estimate of stop durations, and any limitations on the vehicle/asset that are to be accounted for during the day, week, or other time period.

Each vehicle can be assigned a set of service or delivery stops and a driving route that touches some or all of the stops. Estimates of stop-time and service/delivery may also be specified. When multiple vehicles are used, it can be cost-effective to develop an optimized schedule. This schedule optimization may be accomplished by using a multi route optimizer that attempts to assign minimum routes and maximizes stops per vehicle.

Once the optimized route assignments have been made, the dispatch program can define the manifest for each vehicle and designate the sequential stops and service/delivery requirements at each stop.

The work tasks start can be initiated and the dispatch program can sequence the tasks. This approach can recognize that some or all dispatches may not occur simultaneously due to (for example) bottlenecks in driver assignments, fueling, loading, or stop constraints. For example, a driver may not be available at the optimal time, so the schedule may need to be modified to adjust to this change of status.

BRIEF DESCRIPTION OF THE DRAWINGS

The features of various embodiments disclosed herein are described below with reference to the drawings. Throughout the drawings, reference numbers are re-used to indicate correspondence between referenced elements. The drawings are provided to illustrate embodiments described herein and not to limit the scope thereof.

FIG. 7 illustrates a graphical user interface which can be used to reports progress to a user.

FIG. 8 illustrates a further graphical user interface which can be used to report progress to a user.

DETAILED DESCRIPTION

I. Introduction

Street classification can be used to assist in selecting routes for fleet vehicles and provide a way to limit the number of links that may be considered for determining a route. Traditional functional hierarchy classifications (e.g., NAVTEQ's road classification) are one size fits all classifications, not customized to different customer fleets, and can be used with some success for routing fleet vehicles. These traditional functional hierarchy classifications, however, may provide less flexibility, accuracy, and control than may be desirable. For example, a traditional functional hierarchy classification can rank roundabouts and ramps as minor streets. When such a classification ranking is used in routing, streets such as roundabouts and ramps can be excluded as potential streets for use in a route since the roundabouts and ramps may be considered too minor for inclusion, missing potentially important route options for certain fleets.

Advantageously, this disclosure describes embodiments where custom classifications are determined for streets of a network of streets. The custom classifications can be determined based at least in part on one or more custom routes satisfying one or more constraints that are calculated on the network of streets. A score indicative of a hierarchical ranking, degree of importance, or suitability for each street to routes of various lengths can be determined using the custom routes and stored as a custom classification for each street. In turn, the custom classifications can be used to efficiently calculate routes for hundreds or thousands of vehicles of a fleet of vehicles in a short time. The custom classifications can provide indications of custom uses or values of streets for routing particular fleets of vehicles.

The features described herein may also be implemented for non-fleet vehicles, such as in personal vehicle navigation systems. However, for ease of illustration, the remainder of this disclosure will describe routing systems in the context of vehicle fleets, such as fleets of service vehicles, trucks, taxis, other transportation vehicles, emergency vehicles, and the like.

II. Vehicle Management System Overview

Figure 1:
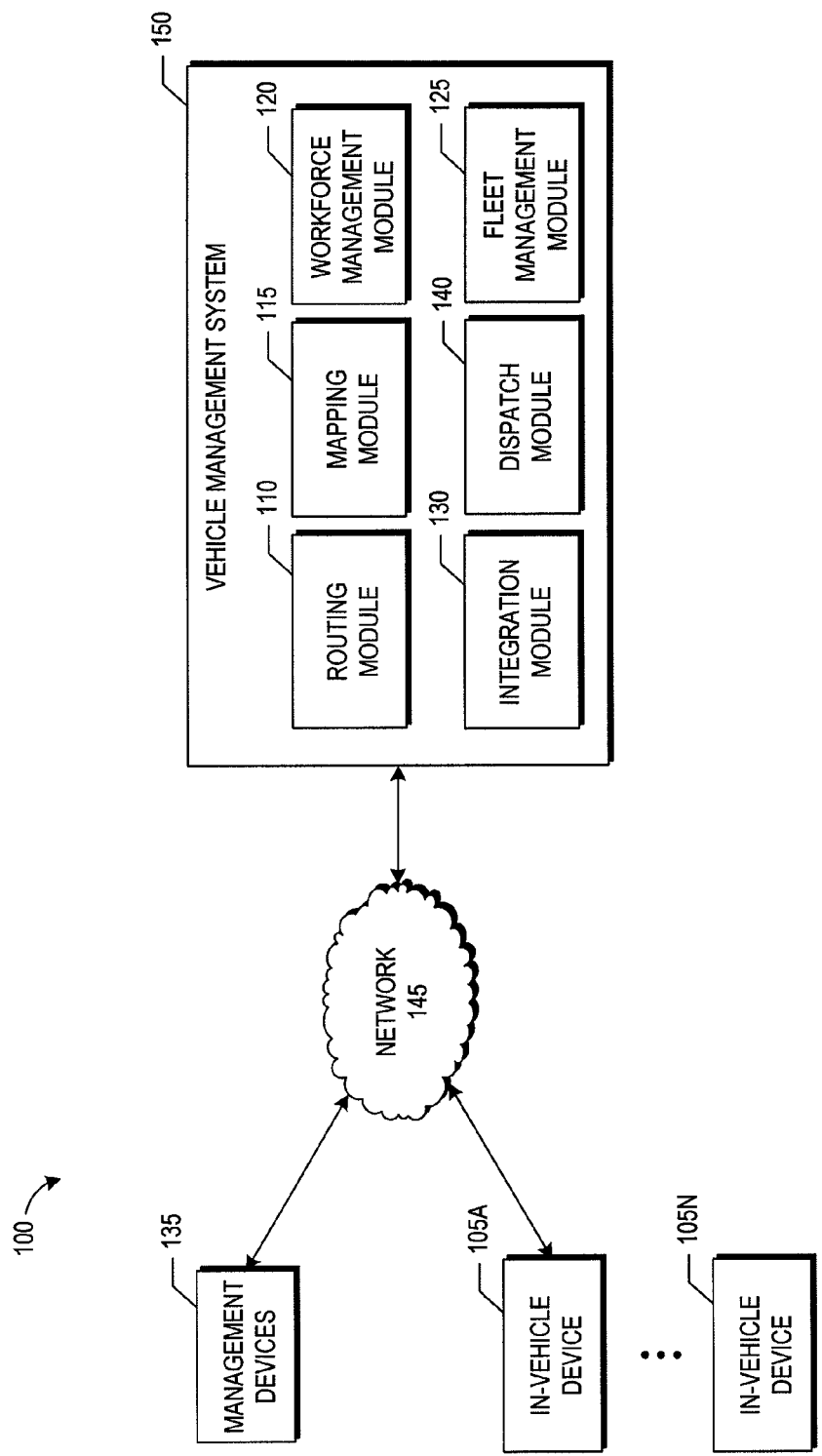
FIG. 1 illustrates an embodiment of a vehicle management system.

FIG. 1 illustrates an embodiment of a computing environment 100 for implementing an example vehicle management system 150. Among other features, the fleet management module 125, can include a progress monitoring module (not shown). The progress monitoring module can be configured to monitor the progress of assets or vehicles along predetermined routes and report progress to a user, such as a fleet vehicle management professional or dispatcher operating the management device 135. Optionally, the progress monitoring module can be configured to compare a status of an asset at a particular time and compare that actual status with expected status of the assets at that same particular time, according to the predetermined route. Further, in some optional embodiments, the progress monitoring module can further be configured to determine a magnitude of a difference between the actual status and the expected status, then report that the threshold is exceeded to a user. The operation of the progress monitoring module is described in greater detail below, with reference to FIGS. 5-10. Additionally, the vehicle management system 150 can determine custom street classifications for streets of a network of streets and perform vehicle routing on the network of streets using the custom classifications.

In the computing environment 100, one or more in-vehicle devices 105A . . . 105N and management devices 135 communicate with the vehicle management system 150 over a network 145. The in-vehicle devices 105 can include computing devices installed in fleet vehicles. These devices 105 can include navigation functionality, routing functionality, and the like. The in-vehicle devices 105 can receive route information and other information from the vehicle management system 150. In addition, the in-vehicle devices 105 can report information to the vehicle management system 150, such as driver location, vehicle sensor data, vehicle status (e.g., maintenance, tire pressure, or the like), and so forth. Example user interfaces for in-vehicle devices 105 are described further below with respect to FIG. 4.

The management devices 135 can be computing devices used by dispatchers, fleet managers, administrators, or other users to manage different aspects of the vehicle management system 150. For example, a user of a management device 135 can access the vehicle management system 150 to generate routes, dispatch vehicles and drivers, and perform other individual vehicle or fleet management functions. With the management devices 135, users can access and monitor vehicle information obtained from one or more of the in-vehicle devices 105 by the vehicle management system 150. Such vehicle status information can include data on vehicle routes used, stops, speed, vehicle feature usage (such as power take-off device usage), driver behavior and performance, vehicle emissions, vehicle maintenance, energy usage, and the like. In some embodiments, the management devices 135 are in fixed locations, such as at a dispatch center. The management devices 135 can also be used by administrators in the field, and may include mobile devices, laptops, tablets, smartphones, personal digital assistants (PDAs), desktops, or the like. Example user interfaces for management devices 135 are described below in detail with respect to FIG. 4.

The vehicle management system 150 can be implemented by one or more physical computing devices, such as servers. These servers can be physically co-located or can be geographically separate, for example, in different data centers. In one embodiment, the vehicle management system 150 is implemented as a cloud computing application. For instance, the vehicle management system 150 can be a cloud-implemented platform hosted in one or more virtual servers and/or physical servers accessible to users over the Internet or other network 145. In the depicted embodiment, the vehicle management system 150 includes a routing module 110, a mapping module 115, a workforce management module 120, an integration module 130, a dispatch module 140, and a fleet management module 125. These components can, but need not, be integrated together on a common software or hardware platform.

The fleet management module 125 can include functionality for generating, rendering, or otherwise displaying a vehicle management user interface. The vehicle management user interface can include a map or list of vehicles that depicts symbols or other data representative of vehicles.

As used herein, the terms "output a user interface for presentation to a user," "presenting a user interface to a user," and the like, in addition to having their ordinary meaning, can also mean (among other things) transmitting user interface information over a network, such that a user device can actually display the user interface.

The fleet management module 125 can communicate with the mapping module 115 to obtain mapping data, which the fleet management module 125 can include in the vehicle management user interface. The mapping data can be compressed, transmitted, re-rendered, and displayed on the management user interface. Other data can also be overlaid to enhance the map and management layout. The mapping module 115 can be a geographic information system (GIS) in one embodiment. The fleet management module 125 can also access vehicle status data based on telematics data obtained from the in-vehicle devices 105N. The telematics data can include such data as location or speed information obtained using GPS or cellular tower triangulation (or other methods), vehicle sensor data, solid state inertial information, or any other data that can be obtained from a vehicle, its engine, or the like (including other sensors such as passenger seat sensors to detect the presence of passengers and so forth).

The routing module 110 can implement any of the routing features described above. In addition, the routing module 110 can construct pre-dispatch or post-dispatch routes for vehicles based on any of a variety of routing algorithms, such as those disclosed in U.S. Publication No. 2010/0153005, filed Dec. 8, 2009, and entitled "System and Method for Efficient Routing on a Network in the Presence of Multiple-Edge Restrictions and Other Constraints," the disclosure of which is hereby incorporated by reference in its entirety. The routing module 110 can automatically select routes that take into account factors that affect energy usage using the techniques described in U.S. Publication No. 2011/0238457, filed Nov. 24, 2010, and entitled "Vehicle Route Selection Based on Energy Usage," the disclosure of which is hereby incorporated by reference in its entirety. In addition, the routing module 110 can perform the street classification and routing processes discussed below in detail with respect to FIG. 3.

The integration module 130 can facilitate integration of the vehicle management system 150 with other systems, such as fuel card systems, payroll systems, supply chain system, insurance systems, and the like. The dispatch module 140 can provide functionality for users of the management devices 135 to assign drivers and vehicles to routes selected by the routing module 110.

The illustrated network 145 may be a LAN, a WAN, the Internet, combinations of the same, or the like. For ease of illustration, the vehicle management system 150 has been depicted as a centralized system. However, in other implementations, at least some of the functionality of the vehicle management system 150 is implemented in other devices. Other possible implementations of the vehicle management system 150 can include many more or fewer components than those shown in FIG. 1.

III. Routing Module Embodiments

Figure 2:
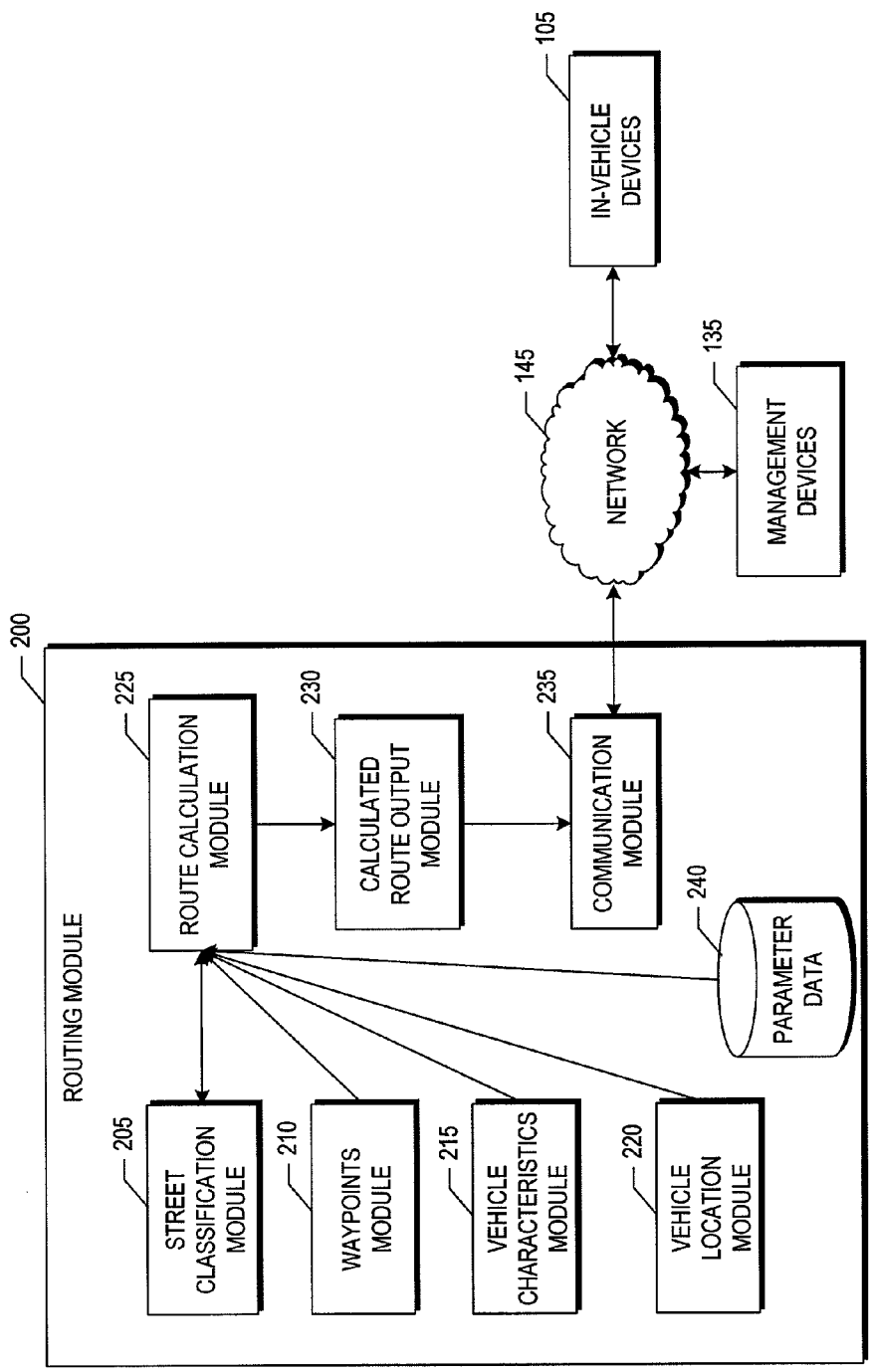
FIG. 2 illustrates an embodiment of a routing module usable with the system of FIG. 1.

Turning to FIG. 2, an embodiment of a routing module 200 is shown. The routing module 200 is a more detailed embodiment of the routing module 110 described above and includes all the features thereof. The routing module 200 can classify streets of a network of streets in a geographic region and use the street classifications to efficiently calculate routes for fleet vehicles on the network of streets. The management devices 135 and in-vehicle devices 105 of FIG. 1 are also shown communicating with the routing module 200 over the network 145.

In the depicted embodiment, the routing module 200 includes a street classification module 205, waypoints module 210, a vehicle characteristics module 215, a vehicle location module 220, a route calculation module 225, a calculated route output module 230, and a communication module 235. The routing module 200 can also include one or more parameter databases or data repositories 240 for storage of information regarding various road parameters, such as, but not limited to, speed limits, one-way vs. two-way information, traffic signal and traffic sign information (e.g., estimated wait times for different times of the day), road hazard or closure information, construction information, and traffic information (e.g., congestions, detours and accident), and the like.

The waypoints module 210 can access waypoint data useful for constructing a route. The waypoint data can include a starting location, a target or destination location, intermediate waypoint locations, landmarks, and the like. The starting and ending location as well as possibly other waypoints can be input by a user of a management device 135. At least some of the waypoints data can also be provided to the waypoints module 210 from the mapping module 115 described above.

The vehicle characteristics module 215 can store vehicle characteristics regarding vehicles in a fleet. These characteristics can be input by a user, for instance. The vehicle characteristics can include, but are not limited to, vehicle energy type based on energy consumption (e.g., gasoline-powered, electric, hybrid, or alternative fuel), vehicle class (e.g., passenger vehicle, commercial truck or trailer, bus), vehicle dimensions, vehicle weight (e.g., unloaded or loaded, estimated or actual), vehicle capacity, vehicle energy functions (e.g., energy regeneration capabilities, limitations on range), maintenance history, and the like.

The vehicle location module 220 can determine location information for each vehicle in the fleet. In one embodiment, this location information is multi-dimensional, such as three-dimensional. For example, the location information can include a latitude component, a longitude component, and an elevation component. The location information can be manually input by a user or can be automatically determined from Global Positioning System (GPS) functionality of the in-vehicle devices 105 or within a mobile device (e.g., a phone) carried by an operator of the vehicle.

The route calculation module 225 can determine one or more alternative feasible, or candidate, routes from a starting waypoint to a destination waypoint. The feasible routes can be determined using one or more initial searching algorithms based on one or more initial criteria, factors or variables (e.g., distance and/or estimated transit time) to trim down the search space to exclude unreasonable routes. The feasible routes can be determined based on input received from the waypoints module 210, the vehicle characteristics module 215, the vehicle location module 220, and/or the parameter database 240. In some embodiments, the route calculation module 225 determines custom routes between waypoint locations based on custom data. The custom routes can, in turn, be used by the street classification module 205 to classify streets of the custom routes for use in efficiently determining how to route fleet vehicles.

The route selection determination methods will be described in more detail below; however, any number of search algorithms or methods can be used without departing from the spirit and/or scope of the disclosure, including but not limited to, breadth-first algorithms, depth-first algorithms, best-first algorithms, Djikstra's algorithm, the Hungarian (Munkres) algorithm, the A* algorithm, Traveling Salesman-related algorithms, linear programming algorithms, and combinations or modifications of the same. Moreover, any number of data structures can be used to implement the algorithms (e.g., graphs, trees, heaps, stacks, queues, priority queues, combinations of the same, and/or the like). One example search algorithm used to generate feasible routes or optimal routes based on a cost function is described in U.S. Patent Application Publication No. 2010/0153005, filed on Dec. 8, 2009, the disclosure of which is hereby incorporated by reference in its entirety.

The street classification module 205 can determine street classifications at least in part based on custom routes calculated by the route calculation module 225. The street classification module 205 can receive custom routes calculated by the route calculation module 225 and analyze the custom routes to determine custom classifications, such as a score indicative of a hierarchical ranking, degree of importance, or suitability of streets for routing fleet vehicles. In some embodiments, the classification can be further based on spatial or topological relationships to other streets for routing, in addition to the class of the streets based on a street's federal or state highway status and the like, number of lanes, or other attributes of streets. The street classification module 205 can store the classifications in the parameter database 240 or outside the routing module 200 via storage connected to the network 145.

In addition, the route calculation module 225 can access and receive street classifications from the street classification module 205, the parameter database 240, or other storage connected to the network 145. The accessed and received street classifications can depend on a characteristic of a routing request (e.g., the fleet vehicle type to be routed, service level selected by the requestor, customer identification code, etc.) for a particular fleet of vehicles.

The route calculation module 225 can further use the street classifications to limit streets of the network that are considered for routing fleet vehicles. For instance, streets having a higher classification score indicative of a higher hierarchical ranking can be considered for longer distances or routes. On the other hand, streets having a classification score indicative of a lower hierarchical ranking can be considered for short distances or routes. In other embodiments, the route calculation module 225 can instead use the street classifications to weight the consideration of streets, determine degree of importance of streets, or predict function or uses of streets, among other possibilities.

The calculated route output module 230 can output the one or more routes identified by the route calculation module 225. The routes can be output to a vehicle-based display unit, a handheld mobile device, and/or to a remote location over the network 145 (e.g., the client computing device 135, the dispatch center 140). In some embodiments, the calculated route output module 230 can output feedback to a driver (e.g., directions, instructions, warnings, alerts, alarms). For example, the calculated route output module 230 can output a real-time suggested driving route modification based on traffic or weather conditions. The output feedback can include voice commands, audible alerts, and/or on-screen text or graphics. The feedback can advantageously change driver behavior to improve energy efficiency and reduce energy use. In some embodiments, the calculated route output module 230 is in communication with, and controls operation of, a display device and/or one or more audio devices.

In some embodiments, the calculated route output module 230 generates audible instructions or signals, thereby permitting a user of an in-vehicle device 105 to follow a route to a destination. Such signals may include, for example, beeps or tones that are generated when a driver approaches a pertinent intersection, or may include verbal directions, such as "turn left ahead." In some embodiments, the verbal directions are in a language the user understands, such as English or French, and the language can be changed by the user of the system based on their personal preferences. Further, in certain embodiments, the voice used to express the verbal directions can be changed without changing the language of the verbal directions.

The communication module 235 can facilitate communication by and with the routing module 200 over the network 145. In some embodiments, the communication module 235 receives data from the network 145 and transmits data to the management device 135 and to the in-vehicle devices 105. The communication module 235 can provide the route calculation module 225 with access to network resources or information databases, such as traffic and weather web sites, over the network 145.

The parameter database 240 can include one or more storage databases or other data repositories. In addition to storing the various road parameters described above, the parameter database can store any data that may be used to determine the costs of routes or portions of routes (e.g., legs). The parameter database 240 can be in communication with the route calculation module 225 and any of the other sub-modules of the routing module 200, such as the street classification module 205. In some embodiments, the parameter database 240 can be communicatively coupled to the network 145. As one example, the parameter database 240 can include look-up tables of information related to street classification data sets comprising street classifications. The look-up information can take characteristics of routing requests as inputs and enable look-ups of corresponding street classification data for use in routing calculations, for example. As another example, the parameter database 240 can store custom data as discussed in this disclosure for use in classifying streets.

In other embodiments, the parameter database(s) 240 or other data repositories can reside on the client computing device 135, at the dispatch center 140, within a vehicle 105, or at other remote locations communicatively coupled to the network 145.

IV. Overall Routing System Process

Figure 3:
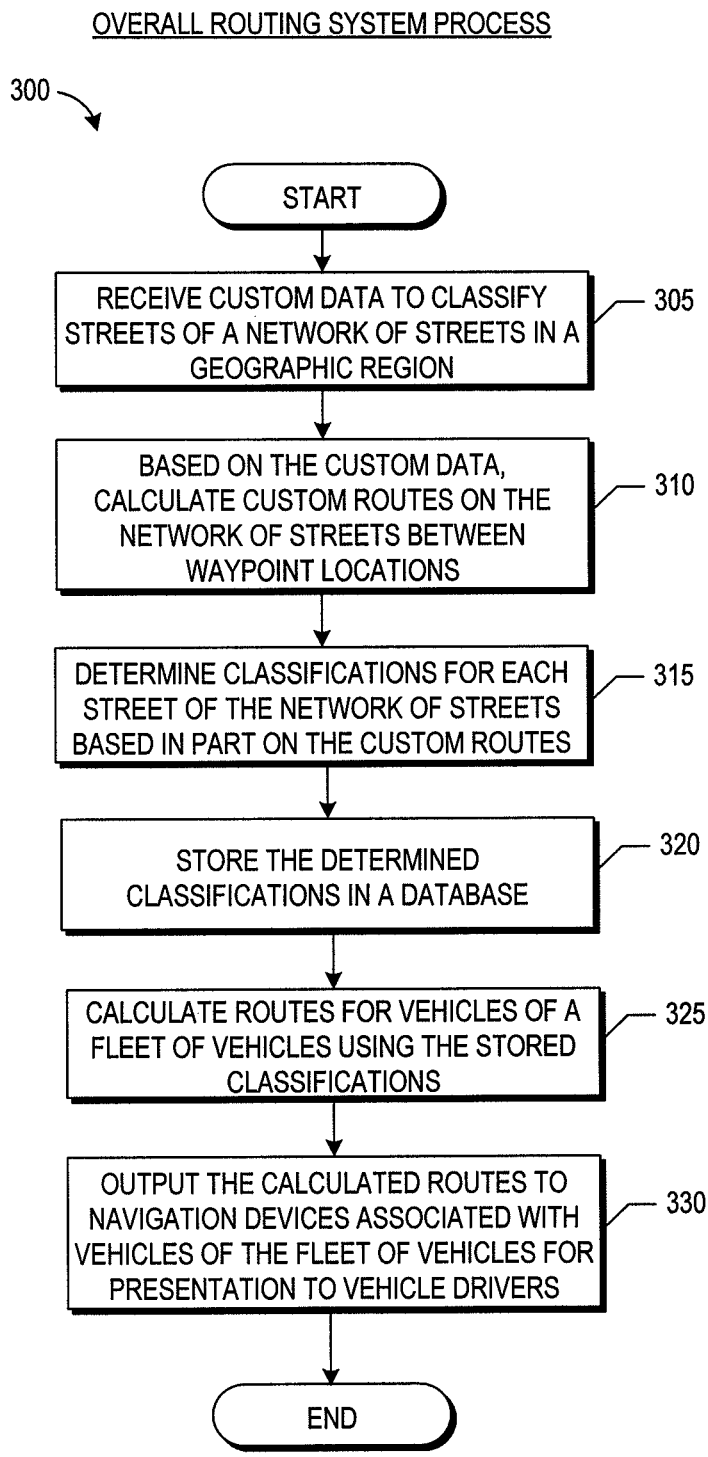
FIG. 3 illustrates an embodiment of an overall routing system process executable by the routing module of FIG. 2.

With reference to FIG. 3, an embodiment of an overall routing system process 300 executable by the routing module

200 is illustrated. In certain embodiments, the routing module 200 can determine a score indicative of a hierarchical ranking of streets in a network of streets in a region by calculating custom routes on network of streets. In some embodiments, the routing module 200 can exclude streets of network of streets from consideration for a route or portion of route based on the score or hierarchical ranking. As a result of trimming down the search space, the routing module 200 can perform faster calculation of routes and enable more direct and efficient determination of routes than using some other methods.

At block 305, the route calculation module 225 receives custom data to classify streets of a network of streets in a geographic region. The custom data can include navigation or routing data used to influence the classification of streets. The custom data can, for example, include physical or legal restrictions relating to vehicles types, street travel limits, route stop requirements, geography like hills and bridges, weight capacities of roads, weather imposed road limitations, traffic effects, and restrictions on transportation of dangerous substances, among other possibilities. Moreover, the custom data can include an indication of a type of fleet vehicle to be routed, such as an automobile, semi-trailer, or hazardous waste truck. In addition, the custom data can include an indication of a route optimization approach, such as time optimization, fuel optimization, or distance optimization. Further, the custom data can include an indication of route conditions to avoid, such as tolls, ferries, borders, or the like. In certain embodiments, the custom data is customized to different customers or users of the vehicle management system 150.

The custom data can be received from the parameter database 240 or over the network 145 from different devices, such as management devices 135 or in-vehicle devices 105. For example, the route calculation module 225 can receive from in-vehicle devices 105 an indication of the type of vehicle in which the in-vehicle devices 105 are installed and use the indication as part of the received custom data. In certain embodiments, the custom data can be initially provided by a manager of the routing module 200 or a route calculation request, and the custom data can then be supplemented or updated by the initial source or other providers of custom data.

At block 310, based on the custom data, custom routes are calculated on the network of streets between waypoint locations by the route calculation module 225. The route calculation module 225 can generate custom routes using one or more initial criteria, variables, or factors indicated by the custom data. In some embodiments, the custom data is used to influence the calculation of custom routes between sets of two waypoint locations on the network of streets. The custom routes can be generated using a route optimization approach indicated in the custom data. In some embodiments, the route calculation module 225 can utilize some custom data and disregard other custom data, and thereby increase the processing speed for determining the custom routes. Moreover, in certain embodiments, the custom routes are calculated for street classification purposes and not for navigation purposes.

At block 315, classifications for each street of the network of streets are determined based at least in part on the custom routes, for example, by the street classification module 205. The classifications for each street can include an assigned score indicative of a hierarchical ranking of streets of the custom routes for calculating routes of different lengths for fleet vehicles. Various approaches can be utilized to determine the classifications, for example, including determining distances between streets and waypoint locations of custom routes or a frequency of occurrences of streets in custom routes. In some embodiments, the classifications are determined for some streets of the network but not others. Such an approach can facilitate parallel processing in classifying streets or permit an update of classifications for only a portion of the network.

At block 320, the determined classifications are stored by the street classification module 205 in a database, such as the parameter database 240. The classifications can be stored using a look-up table or other storage approach to facilitate access of the classification data for use in calculating routes.

At block 325, the route calculation module 225 calculates routes for vehicles of a fleet of vehicles using the stored classifications. The route classification module 225 can initially access the classifications stored in the parameter database 240 and associate the classifications with the streets of the network. Further, the route classification module 225 can access the waypoints module 210 for waypoint data, including starting locations, target or destination locations, intermediate waypoint locations, landmarks, and the like for the routes. The vehicle characteristics module 215 can provide vehicle characteristics regarding vehicles in the fleet, and the vehicle location module 220 can determine location information for each vehicle in the fleet.

The route calculation module 225 can then generate feasible, or candidate, routes based one or more initial criteria, variables, or factors. For example, the feasible routes can be generated based on shortest distance or estimated transit time. Feasible routes can also include routes having a characteristic within a predefined percentage of the "best" route, such as a route having a time or distance within about 1%, within about 5%, or within about 10% of the calculated best route.

In some embodiments, the calculation of routes is performed using one or more other initial search algorithms to provide an initial reduction of the total number of possible routes to further trim down the search space. For example, the initial reduction can narrow down the possible routes to exclude highly improbable routes. The initial search algorithms can include, for example, Djikstra's algorithm, Munkres (Hungarian) algorithm, breadth-first algorithms, depth-first algorithms, best-first algorithms, and/or the like. In some embodiments, heuristic search techniques (such as A* search or other such techniques) can be implemented to narrow down the time and complexity of the search for routes.

At block 330, the calculated route output module 230 outputs calculated routes to navigation devices associated with vehicles of the fleet of vehicles for presentation to vehicle driver. The navigation devices for instance can include an in-vehicle device 105 or handheld mobile device of a driver, for instance.

V. Street Classification Processes

The computing environment 100 can include a street classification module, such as the street classification related system components and methods disclosed in U.S. patent application number, the entire contents of which is hereby incorporated by reference.

Figure 4:
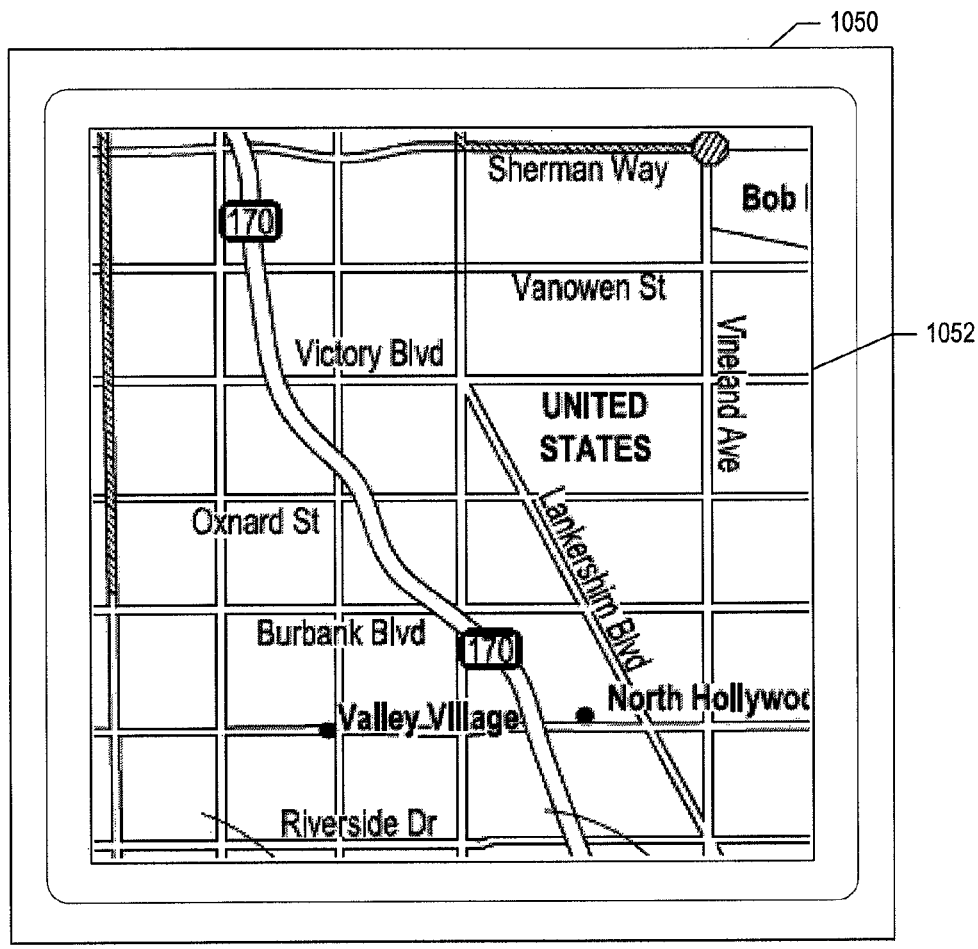
FIG. 4 illustrates an embodiment of a user interface display for outputting routes calculated using custom street classifications.

Turning to FIG. 4, an embodiment of a user interface 1050 for outputting routes calculated using street classifications by with custom data is illustrated. The user interface 1050 can be part of one or more navigation devices associated with the plurality of vehicles, such as management devices 135 or in-vehicle devices 105. The map display 1052 of the user interface 1050 can present a street map with visual aids or directions that update in real time as the driver travels, thereby showing the driver's progress. The map display 1052 can display one or more routes, which may include one or more intermediate stops. The visual aids can include arrows or similar colored lines overlaid over a street map.

The user interface 1050 can include, but is not limited to, an LCD display, a heads-up display, an LED display, a 2D display, and/or a 3D display to instruct a user of the system which way to travel. In some embodiments, images displayed on the map display 1052 simulate motion, such as a vehicle traveling down a city street. In some embodiments, the screen is interactive. For example, in some embodiments the user can input his current and destination locations, can update costs for given streets or routes, or can change his destination en route.

In some embodiments, the routing module 200 and the user interface 1050 are integrated into a vehicle navigation system or similar system. For example, in some embodiments, the visual outputs of the calculated route output module 230 are output via the vehicle's in-dash video display, and/or the audio outputs of the calculated route output module 230 are output via the car's audio speakers. In other embodiments, the user interface 1050 is integrated within a mobile handheld device in communication with the network 145. In some embodiments, a vehicle or similar device is controlled directly by the routing module 200.

Once dispatch has begun, the manager may monitor progress of each vehicle as it moves through its assigned route. The platform or vehicle management system can incorporate a progress monitoring module that allows real-time (or near-real-time) monitoring of individual vehicles and groups of vehicles throughout the work day. The vehicle management system can compare the actual performance with the planned and/or request route-scheduling.

A progression feature can provide the ability to provide dispatch and real-time (or near-real time) comparison of planned versus actual progress on a minute-to-minute basis. Using a color Gantt display, vehicle history timeline, or the like, off-schedule events (e.g., actual events that may be different than planned events) can be marked using color changes that are initiated at the time the deviations occur.

The comparison of a plan to actual events can be done using a mobile data acquisition engine. Vehicle location, speed, and other status data can be provided at time-stamped intervals and written to a database. Mobile systems can provide the tools for data acquisition and provide the real-time data useful for determining location and status for a multiplicity of vehicles in real-time or near-real-time.

VI. Progress Monitoring

As noted above, the vehicle management system 150 can include a progress monitoring module, included in the fleet management module 125, or another one of the modules illustrated in FIG. 1. Other configurations can also be used.

In some embodiments, the progress monitoring module can refer to a predetermined route, such as the route described above and illustrated in FIG. 4. Although only one route is illustrated in FIG. 4, the routing module 200 can be configured to generate a plurality of routes for a corresponding plurality of vehicles of a vehicle fleet. Thus, in such embodiments, the progress monitoring module can refer to such a plurality of predetermined routes for purposes of monitoring progress of vehicles along those routes.

For example, under certain conditions of use, the routing module 200 might be used to generate all of the routes for all of the vehicles in the fleet to be followed for one day of operation. The progress monitoring module can be configured to track the progress of each of those vehicles along their respective predetermined routes and to report progress to a user using, for example, one of the management devices 135 (FIG. 1).

Further, optionally, the progress monitoring module can be configured to compare the actual progress of one or more of the vehicles along their respective predetermined routes with the expected progress of those vehicles along their respective predetermined routes. The progress monitoring module can be configured to calculate a magnitude of the difference between the actual progress and the expected progress and to compare that difference to a predetermined threshold. For example, the progress monitoring module can be configured to allow a user to input a threshold of different that, when exceeded, will cause the progress monitoring module to output a corresponding report to the user indicating that the threshold is exceeded. For example, such reports could include highlighting and identification of a particular vehicle, or the calculated value itself that has exceeded the predetermined threshold.

Figure 5:
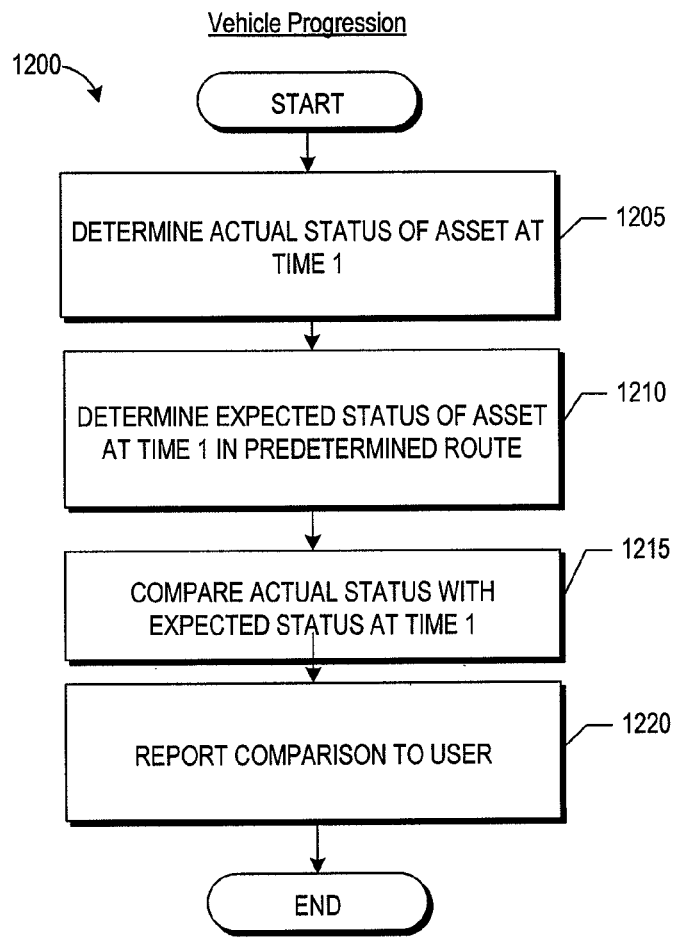
FIG. 5 illustrates an embodiment of a progress monitoring process executable by a progress monitoring module.

With reference to FIG. 5, and embodiments of a progress monitoring process 1200 executable by progress monitoring module is illustrated. In some embodiments, the process 1200 can determine actual status of an asset at a reference time, identified as Time 1. For example, in operation block 1205, the progress monitoring module can access the location of an asset, such as a vehicle of a vehicle of a fleet using GPS technology, or other locating techniques. Such techniques are well known in the art and are not described further herein. After the operation block 1205, the process 1200 can move on to operation block 1210.

In operation block 1210, the progress monitoring module can determine the expected status of the vehicle at Time 1 in the predetermined route. For example, the predetermined route can be the route described above with reference to FIG. 4. Embedded in the predetermined route is a timeline indicating the actual location of the vehicle at particular times. Thus, the progress monitoring module can extract the relevant location as corresponding to the Time 1. After the operation block 1210, the process 1200 can move on to operation block 1215.

In the operation block 1215, the process 1200 can compare the actual status determined in operation block 1205 with the expected status of the vehicle determined in operation block 1210. For example, the progress monitoring module can compare the actual location of the vehicle at Time 1 with the expected time that the vehicle should have reached that location. Thus, in such an embodiment, the progress monitoring module calculates a time differential indicating whether the associated vehicle is ahead of schedule or behind schedule. Optionally, the progress monitoring module can make other comparisons. For example, the route illustrated in FIG. 4 could also include an estimated fuel consumption. For example, the route illustrated in FIG. 4 can include an estimated total fuel use for each point along the route.

In such embodiments, the progress monitoring module could access diagnostic information from the associated vehicle, using known techniques, to determine the amount of fuel consumption at each point along the route. Thus, in such an embodiment, the progress monitoring module can compare the actual status of the vehicle, and in particular, the cumulative amount of fuel used from the beginning of the route to the expected amount of fuel used. Other aspects of the progress of the vehicle along the predetermined route can also be used as an indication of status. After the operation block 1215, the process 1200 can move on to operation block 1220.

Figures 7, 8:
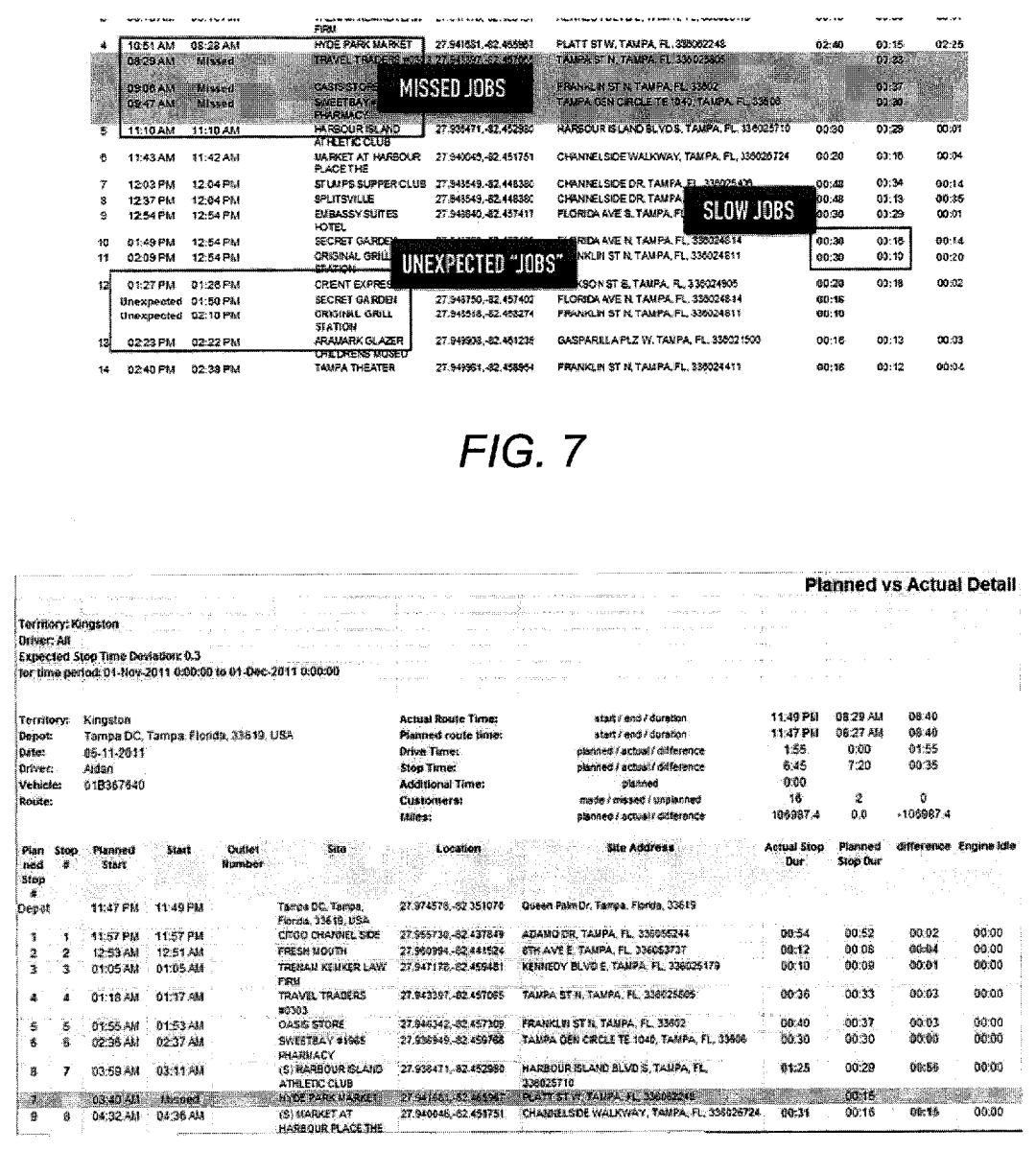

In operation block 1220, the progress monitoring module can report the results of the comparison to a user. For example, as shown in FIGS. 7 and 8, the progress monitoring module can be configured to output a list of stops for one or more vehicles indicating "slow jobs" as jobs or stops along the predetermined route in which the vehicle was late. Similarly, the progress monitoring module could output indications referring to "missed jobs". Further, progress monitoring module can highlight when a vehicle has performed "unexpected jobs". The report further illustrates an optional organization for output from the progress monitoring module.

Figure 9:
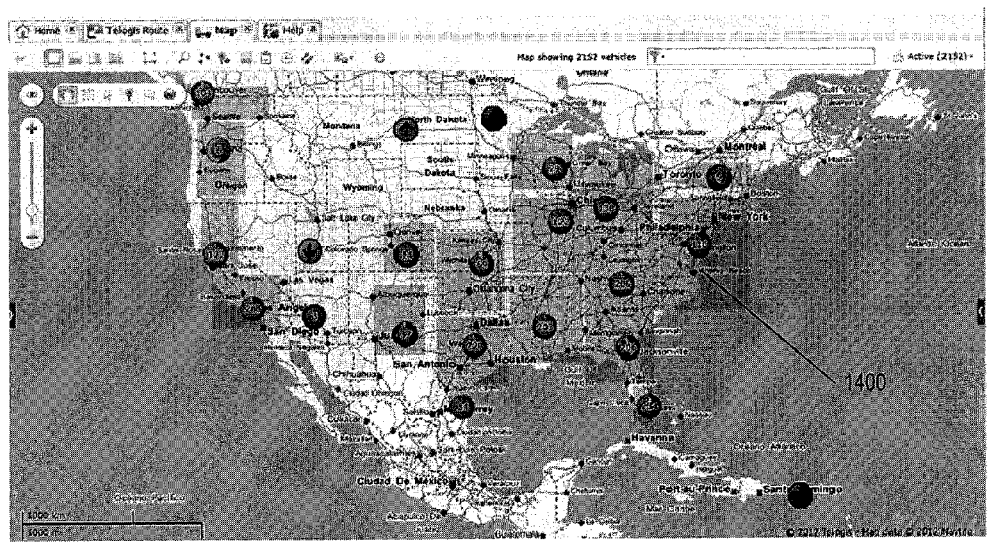
FIG. 9 illustrates a graphical user interface including clustered indication of progress.
Figure 10:
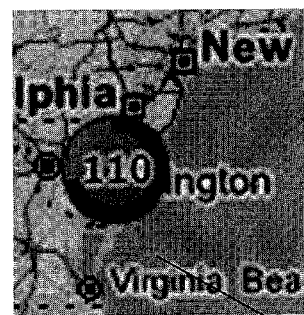
FIG. 10 is an enlargement of a portion of the graphical user interface of FIG. 9.

The output from the progress monitoring module, with regard to outputting progress of vehicles along a predetermined route, can be included in clustered graphical reporting. For example, as shown in FIGS. 9 and 10, progress monitoring module can create a graphical representation of a cluster of vehicles, with a graphical representation of the proportions of on-time jobs completed and slow jobs. For example, with reference to the cluster identified by the reference 1400, a graphical cluster indication shows a representation of 110 vehicles. In this embodiment, about one quarter of those vehicles are on time and thus the indication 1400 is one quarter green along its periphery. On the other hand, three quarters of the vehicle are slow along their routes, and thus three quarters of the periphery of the indicator 1400 is red. Other techniques can also be used.

Figure 6:
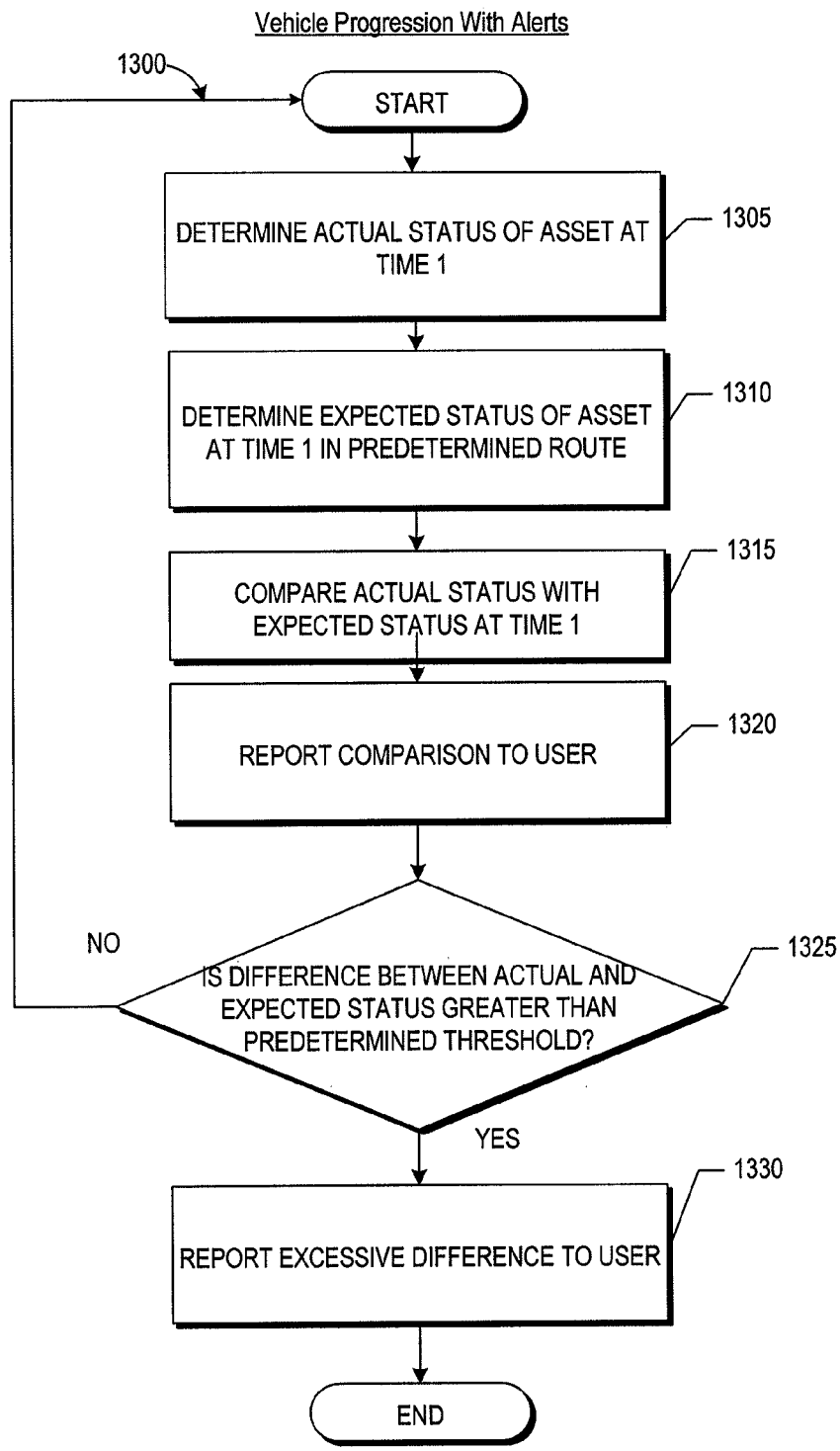
FIG. 6 illustrates a further embodiment of a progress monitoring process.

With reference to FIG. 6, the progress monitoring module can also be configured to perform a process 1300 which includes an optional determination if a magnitude of a difference between actual status and expected status is greater than a predetermined threshold.

For example, the process 1300 can operate essentially similar to the process 1200 of FIG. 5. However, the process 1300 can include a decision block 1325 in which it is determined whether the actual status determined in operation block 1305 and the expected status determined in operation block 1310, is greater than a predetermined threshold. If the difference is not greater than a predetermined threshold, then the process 1300 returns and reruns. However, if the difference determined in decision block 1325 is greater than the predetermined threshold, then the process 1300 can move on to operation block 1330.

In operation block 1330, the process 1300 and output in excess of difference indication to a user. For example, as noted above with regard to FIGS. 7-10, the progress monitoring module can be configured to highlight or color red, or do other things to visually or otherwise indicate to a user that the predetermined threshold is exceeded. Other techniques can also be used.

VII. Terminology

As used herein, the term "street," in addition to having its ordinary meaning, can include, among other things, a road, a highway, a freeway, a toll road, a turnpike, an arterial road, a frontage road, an on-ramp, an off-ramp, a city street, a surface street, a residential street, a dirt road, a parking lot, a driveway, an intersection, a traffic circle, a roundabout, a rotary, an alley, any path upon which a vehicle can travel, combinations of the same, or the like. Further, although this specification refers primarily to streets for automobiles, trucks, and the like, the techniques described herein can also be applied to paths traveled by other vehicles, such as railroads, flight paths, and waterways.

Many variations other than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together. Execution in a cloud computing environment in some embodiments supports a multiplicity of conditions to be computed contemporaneously.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the vehicle management system 150 can be implemented by one or more computer systems or by a computer system including one or more processors. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for presenting fleet vehicle progress information regarding job progress in real-time to a manager of vehicles in a fleet of vehicles that service a plurality of stops associated with a plurality of jobs, the system comprising:

a computer system comprising computer hardware configured to:

access a plurality of routes for a plurality of vehicles in a fleet of vehicles, the plurality of routes connecting a plurality of stops via a network of streets in a geographic region, the plurality of stops associated with a plurality of jobs serviced by the plurality of vehicles;

determine actual statuses of the plurality of vehicles as the plurality of vehicles travel along the plurality of routes to service the plurality of jobs, the actual statuses of the plurality of vehicles determined based at least on vehicle telematics data from in-vehicle devices associated with the plurality of vehicles, the vehicle telematics data comprising data indicative of physical locations of the plurality of vehicles;

determine progress indications for the plurality of vehicles as the plurality of vehicles travel along the plurality of routes to service the plurality of jobs, the progress indications comprising a route segment fuel usage indication and at least two of a missed job indication, an unexpected job indication, and a slow job indication, wherein the progress indications are determined based at least on comparisons of (i) the actual statuses of the plurality of vehicles as the plurality of vehicles travel along the plurality of routes to service the plurality of jobs to (ii) expected statuses of the plurality of vehicles as the plurality of vehicles travel along the plurality of routes to service the plurality of jobs, the expected statuses of the plurality of vehicles indicative of estimated progress for the plurality of vehicles as the plurality of vehicles travel along the plurality of routes to service the plurality of jobs, wherein the route segment fuel usage indication is determined based at least on a comparison of (i) an actual fuel consumption by one vehicle of the plurality of vehicles to travel a route segment of a plurality of route segments of a route of the plurality of routes as the one vehicle travels the route to (ii) an estimated fuel consumption for the one vehicle to travel the route segment as the one vehicle travels the route; and output at least some of the actual statuses of the plurality of vehicles, at least some of the expected statuses of the plurality of vehicles, and the progress indications to a display for presentation together to a manager of the plurality of vehicles.

2. The system of claim 1, wherein the computer system comprising the computer hardware is configured to determine at least some of the progress indications by calculating magnitudes of differences between the actual statuses of the plurality of vehicles and the expected statuses of the plurality of vehicles.

3. The system of claim 2, wherein the computer system comprising the computer hardware is configured to:

receive an input from the manager defining a threshold related to at least one of the magnitudes; and determine at least one of the progress indications by determining if the at least one of the magnitudes is greater than the threshold.

4. The system of claim 3, wherein the presentation of the at least one of the progress indications comprises presentation of a visual alert to the manager that the at least one of the magnitudes is greater than the threshold.

5. The system of claim 4, wherein the visual alert comprises coloring of information output to the display for presentation to the manager.

6. The system of claim 3, wherein the presentation of the at least one of the progress indications comprises presentation of a value of the at least one of the magnitudes to the manager.

7. The system of claim 1, wherein the computer system comprising the computer hardware is configured to output the at least some of the actual statuses of the plurality of vehicles, the at least some of the expected statuses of the plurality of vehicles, and at least some of the progress indications to the display for presentation together as part of a report that lists at least some of the plurality of stops for one of the plurality of vehicles, the report comprising textual highlighting indicative of one or more stops associated with the progress indications.

8. The system of claim 1, wherein the progress indications comprise the missed job indication, the unexpected job indication, and the slow job indication.

9. The system of claim 1, wherein the computer system comprising the computer hardware is configured to output on a geographic map a graphical representation of a cluster of vehicles of the plurality of vehicles to the display for presentation to the manager, the cluster comprising a first coloring of a first portion of the graphical representation indicating a first proportion of the cluster of vehicles that satisfy a progress threshold and a second coloring of a second portion of the graphical representation indicating a second proportion of the cluster of vehicles that do not satisfy the progress threshold.

10. The system of claim 9, wherein the graphical representation comprises a circle, and the first portion comprises a first periphery portion of the circle and the second portion comprises a second periphery portion of the circle, a size of the first periphery portion corresponding to the first proportion of the cluster of vehicles that satisfy the progress threshold and a size of the second periphery portion corresponding to the second proportion of the cluster of vehicles that do not satisfy the progress threshold.

11. The system of claim 9, wherein the progress threshold is satisfied by vehicles of the cluster of vehicles that are on time servicing the plurality of jobs, and the progress threshold is not satisfied by vehicles of the cluster of vehicles that are not on time servicing the plurality of jobs.

12. A method for presenting fleet vehicle progress information regarding job progress in real-time to a manager of vehicles in a fleet of vehicles that service a plurality of stops associated with a plurality of jobs, the method comprising:

accessing a plurality of routes for a plurality of vehicles in a fleet of vehicles, the plurality of routes connecting a plurality of stops via a network of streets in a geographic region, the plurality of stops associated with a plurality of jobs serviced by the plurality of vehicles;

determining actual statuses of the plurality of vehicles as the plurality of vehicles travel along the plurality of routes to service the plurality of jobs, the actual statuses of the plurality of vehicles determined based at least on vehicle telematics data from in-vehicle devices associated with the plurality of vehicles, the vehicle telematics data comprising data indicative of physical locations of the plurality of vehicles;

determining progress indications for the plurality of vehicles as the plurality of vehicles travel along the plurality of routes to service the plurality of jobs, the progress indications comprising a route segment fuel usage indication and at least two of a missed job indication, an unexpected job indication, and a slow job indication, wherein the progress indications are determined based at least on comparisons of lithe actual statuses of the plurality of vehicles as the plurality of vehicles travel along the plurality of routes to service the plurality of jobs to (ii) expected statuses of the plurality of vehicles as the plurality of vehicles travel along the plurality of routes to service the plurality of jobs, the expected statuses of the plurality of vehicles indicative of estimated progress for the plurality of vehicles as the plurality of vehicles travel along the plurality of routes to service the plurality of jobs, wherein the route segment fuel usage indication is determined based at least on a comparison of (i) an actual fuel consumption by one vehicle of the plurality of vehicles to travel a route segment of a plurality of route segments of a route of the plurality of routes as the one vehicle travels the route to (ii) an estimated fuel consumption for the one vehicle to travel the route segment as the one vehicle travels the route; and outputting at least some of the actual statuses of the plurality of vehicles, at least some of the expected statuses of the plurality of vehicles, and the progress indications to a display for presentation together to a manager of the plurality of vehicles, wherein the method is performed by a computer system comprising computer hardware.

13. The method of claim 12, wherein said determining the progress indications comprises calculating magnitudes of differences between the actual statuses of the plurality of vehicles and the expected statuses of the plurality of vehicles.

14. The method of claim 13, further comprising receiving an input from the manager defining a threshold related to at least one of the magnitudes, wherein said determining the progress indications comprises determining at least one of the progress indications by determining if the at least one of the magnitudes is greater than the threshold.

15. The method of claim 14, wherein the presentation of the at least one of the progress indications comprises presentation of a visual alert to the manager that the at least one of the magnitudes is greater than the threshold.

16. The method of claim 14, wherein the presentation of the at least one of the progress indications comprises presentation of a value of the at least one of the magnitudes to the manager.

17. The method of claim 12, wherein said outputting comprises outputting the at least some of the actual statuses of the plurality of vehicles, the at least some of the expected statuses of the plurality of vehicles, and at least some of the progress indications to the display for presentation together as part of a report that lists at least some of the plurality of stops for one of the plurality of vehicles, the report comprising textual highlighting indicative of one or more stops associated with the progress indications.

18. The method of claim 12, further comprising outputting on a geographic map a graphical representation of a cluster of vehicles of the plurality of vehicles to the display for presentation to the manager, the cluster comprising a first coloring of a first portion of the graphical representation indicating a first proportion of the cluster of vehicles that satisfy a progress threshold and a second coloring of a second portion of the graphical representation indicating a second proportion of the cluster of vehicles that do not satisfy the progress threshold.

19. The method of claim 18, wherein the graphical representation comprises a circle, and the first portion comprises a first periphery portion of the circle and the second portion comprises a second periphery portion of the circle, a size of the first periphery portion corresponding to the first proportion of the cluster of vehicles that satisfy the progress threshold and a size of the second periphery portion corresponding to the second proportion of the cluster of vehicles that do not satisfy the progress threshold.

20. The method of claim 18, wherein the progress threshold is satisfied by vehicles of the cluster of vehicles that are on time servicing the plurality of jobs, and the progress threshold is not satisfied by vehicles of the cluster of vehicles that are not on time servicing the plurality of jobs.

* * * * *